(12) United States Patent
Chen

(10) Patent No.: US 8,542,396 B2
(45) Date of Patent: Sep. 24, 2013

(54) SYSTEM OF MAKING A PERSONALIZED PHOTO ALBUM

(76) Inventor: Yi-Lin Chen, Taichung (TW)

( * ) Notice: Subject to any disclaimer, the term of this patent is extended or adjusted under 35 U.S.C. 154(b) by 388 days.

(21) Appl. No.: 12/908,983

(22) Filed: Oct. 21, 2010

(65) Prior Publication Data
US 2012/0099156 A1   Apr. 26, 2012

(51) Int. Cl.
*G06K 15/00* (2006.01)
*G06F 3/12* (2006.01)

(52) U.S. Cl.
USPC ......................................... 358/1.18; 358/1.13

(58) Field of Classification Search
USPC ................ 358/1.1, 1.9, 1.13, 1.15, 1.18, 302, 358/449; 382/103, 132, 164, 173, 174
See application file for complete search history.

(56) References Cited

U.S. PATENT DOCUMENTS

| | | | |
|---|---|---|---|
| 8,024,658 B1 * | 9/2011 | Fagans et al. | 715/730 |
| 8,131,114 B2 * | 3/2012 | Wang et al. | 382/284 |
| 8,161,379 B2 * | 4/2012 | Waltman et al. | 715/247 |
| 8,238,662 B2 * | 8/2012 | Banerjee et al. | 382/181 |

* cited by examiner

*Primary Examiner* — Gabriel Garcia
(74) *Attorney, Agent, or Firm* — Rosenberg, Klein & Lee

(57) ABSTRACT

A personalized photo album preparing system edits digital photos according to the page format of a photo album and allows people to browse or print on a network after saving them. The system includes a processing unit, a displaying unit, a human-machine interface, and an outputting unit. The processing unit is built in with design software. One can manipulate the design software via the human-machine interface to selectively edit the page format and digital photos in the album. The user can further output the digital photos that are edited and saved. Therefore, the invention enables its user to create a desired page format and digital photos.

4 Claims, 5 Drawing Sheets

SYSTEM OF MAKING A PERSONALIZED PHOTO ALBUM

BACKGROUND OF THE INVENTION

1. Field of Invention

The invention relates to photo album editing technology and, in particular, to a personalized photo album preparing system.

2. Related Art

With the advent of digital image technology, most static images are stored as digital photos. Although such digital photos can be directly drowsed on a user's computer display, digital camera, or digital photo frame, there are still the shortcomings that one cannot easily modify or edit the images. Although there are many different kinds of professional editing software on the market (such as Photoshop and PhotoImpact) to magnify, shrink, locally extract, adjust the background of a photo and then output the edited digital photo, there is a certain difficulty in learning to use such editing software. Moreover, the editing process is quite time-consuming. Besides, the photo album is not completed until all the photos are printed. The user cannot see the result until the photos are put in order. It is thus very inefficient.

SUMMARY OF THE INVENTION

An objective of the invention is to provide a personalized photo album preparing system that helps its user to quickly create a personalized photo album.

To achieve the above objective, the disclosed personalized photo album preparing system allows the editing of the page format of the album and the digital photos. It includes: a processing unit, a displaying unit, a human-machine interface, and an outputting unit.

The processing unit performs logic calculations, stores or outputs the above-mentioned page format and digital photos. The processing unit is built in with design software for editing the page format and the digital photos. The user first starts the processing unit and then uploads and stores digital photos to specific addresses thereof.

The displaying unit connects to the processing unit for displaying the operating interface of the processing unit and the design software.

The human-machine interface connects to the processing unit and has the function of manipulating the processing unit and the design software. Through the preview and display of the displaying unit, the user can edit via the human-machine interface a page format to have one or more empty frames for the attachment of digital photos. After editing the page format, clicking any empty frame via the human-machine interface initiates a photo selecting screen for the user to selectively attach a digital photo to the empty frame. The selected digital photo automatically adjusts and records itself in order to fit the empty frame. The user can also edit the digital photo already in the frame. Afterwards, the page format thus edited is stored along with the edited digital photos. They are then stored in a new storage address.

The outputting unit connects to the processing unit. It has the function of outputting the edited page format and digital photos.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
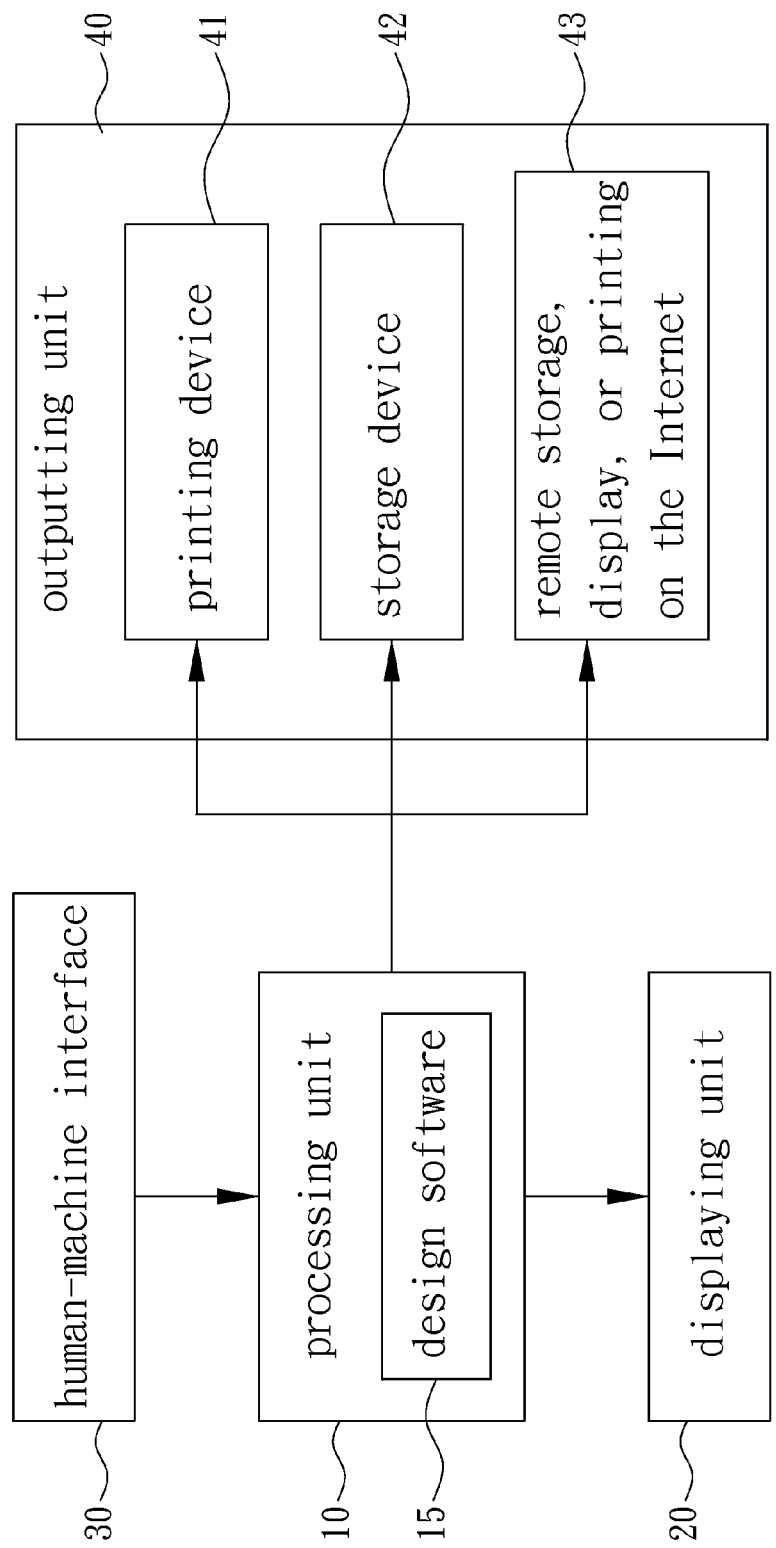
FIG. 1 is a block diagram of the disclosed system.

The invention provides a personalized photo album preparing system and, in particular, a preparing system that edits digital photos according to a page format and allows people to browse or print on a network. As shown in FIG. 1, the system includes a processing unit 10, a displaying unit 20, a human-machine interface 30, and an outputting unit 40.

Figure 2:
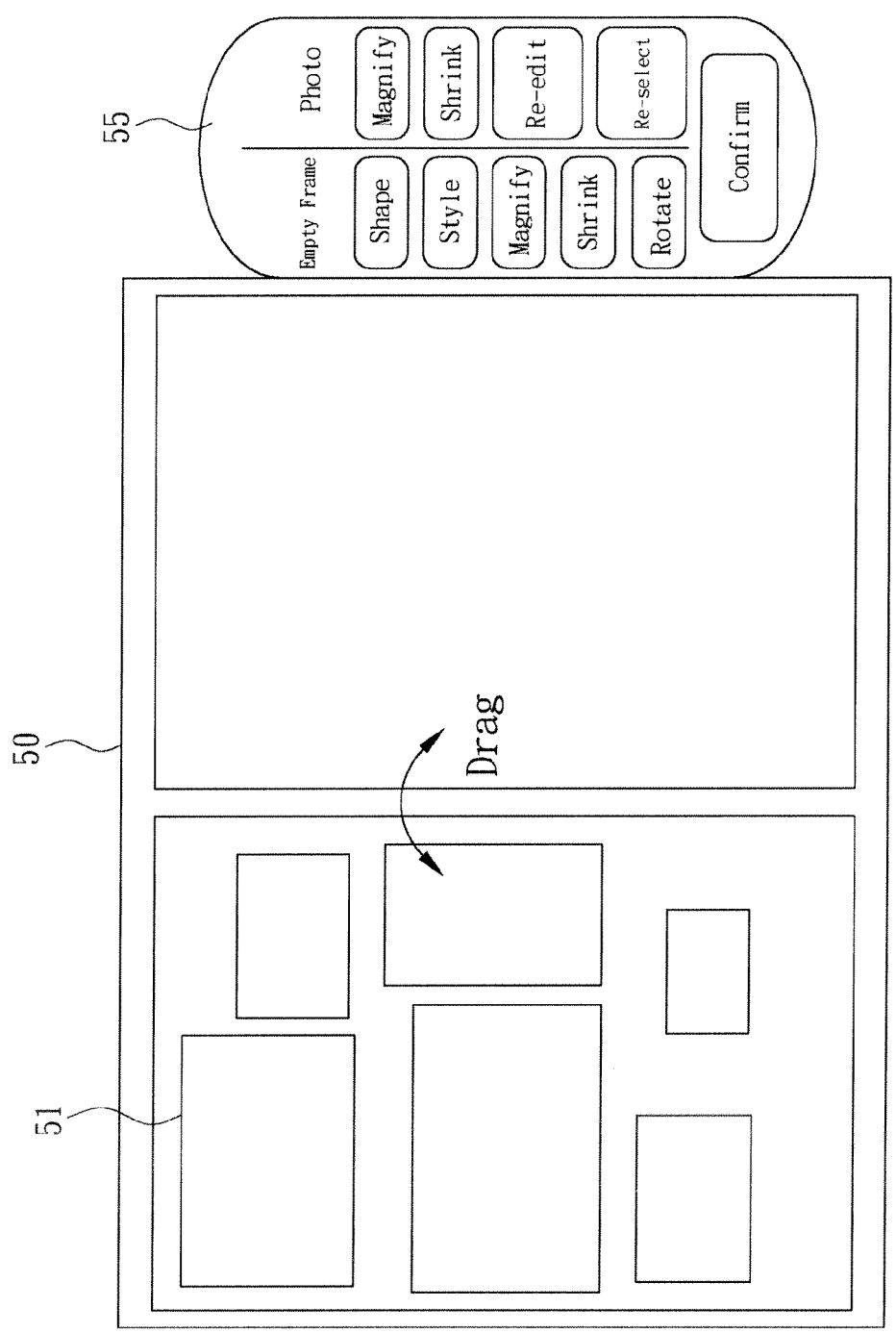
FIG. 2 is a schematic view of a default page format according to the invention.
Figure 3:
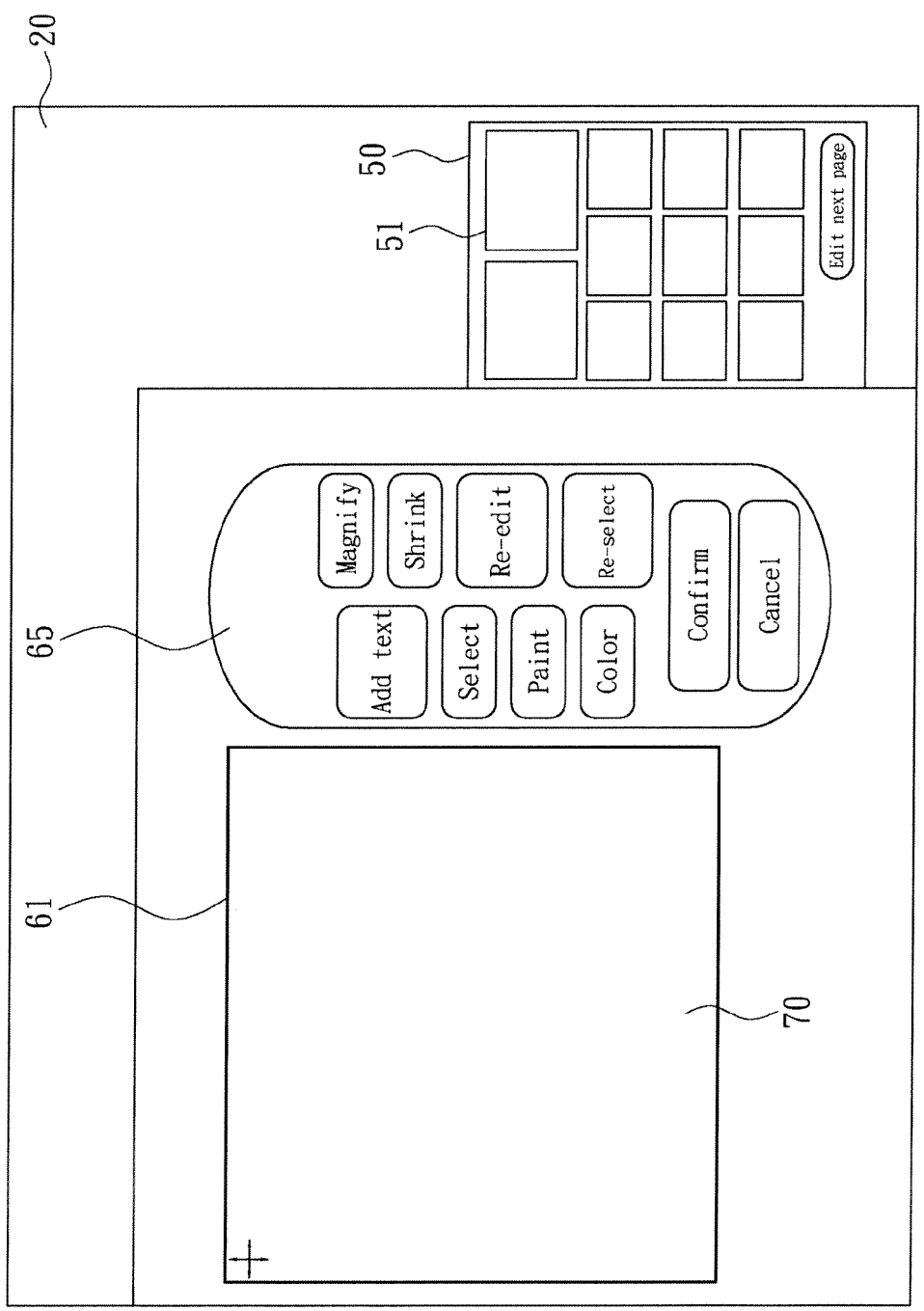
FIG. 3 is a schematic view of using the invention to edit a digital photo.

The processing unit 10 can be a remote server, computer, or mobile phone that can transmit information in a wired or wireless method. The processing unit 10 is built in with design software 15 for editing and storing different page format templates of the photo album. It controls the shape, size, angle, and position of frames in the page format (FIG. 2). The design software 15 further edits a digital photo by magnifying or shrinking it, adding or removing text thereon, locally extracting its parts, adjusting its background, or coloring it (FIG. 3).

The displaying unit 20 connects to the processing unit 10 for displaying the operating interface of the design software 15, digital photos and their edition. The displaying unit 20 can be a liquid crystal display (LCD), plasma display (PD), or touch-control display.

The human-machine interface 30 connects to the processing unit 10. Through the preview and display of the displaying unit 20, the user can make use of all functions of the processing unit 10 and the design software 15 via the human-machine interface 30. The human-machine interface 30 can be a keyboard, mouse, or touch-control display.

The outputting unit 40 connects to the processing unit 10 too. The outputting unit 40 outputs the edited page format and digital photos of an album to a printing device 41, a storage device 42, or a remote storage, display, or printing device 43 on the Internet.

Figure 4:
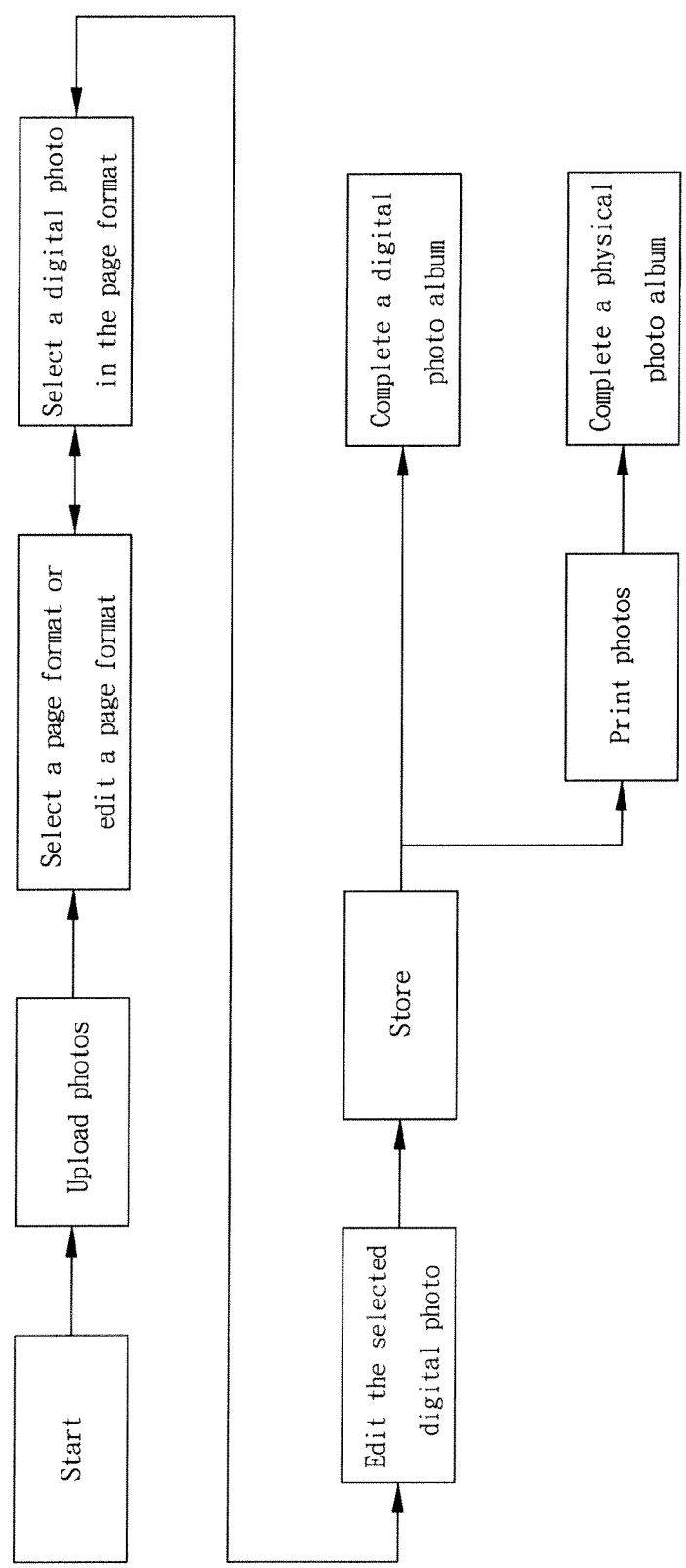
FIG. 4 is a flowchart of the invention.

Please refer to FIG. 4. The setup of the above-mentioned system enables a user to prepare a digital photo album through the steps of: initiating, uploading, selecting a page format or editing a page format, selecting a digital photo in the page format, editing the selected digital photo, and storing. Alternatively, the user can directly print the edited digital photos to produce a physical photo album.

In the initiating step, the user initiates the design software 15 of the processing unit 10. To increase data security, the initiation of the design software 15 can be designed to have a routine that requires account and password or biological character to log into the system.

In the uploading step, the digital photos are uploaded and stored to specific addresses in the processing unit 10 (remote server or computer).

Figure 5:
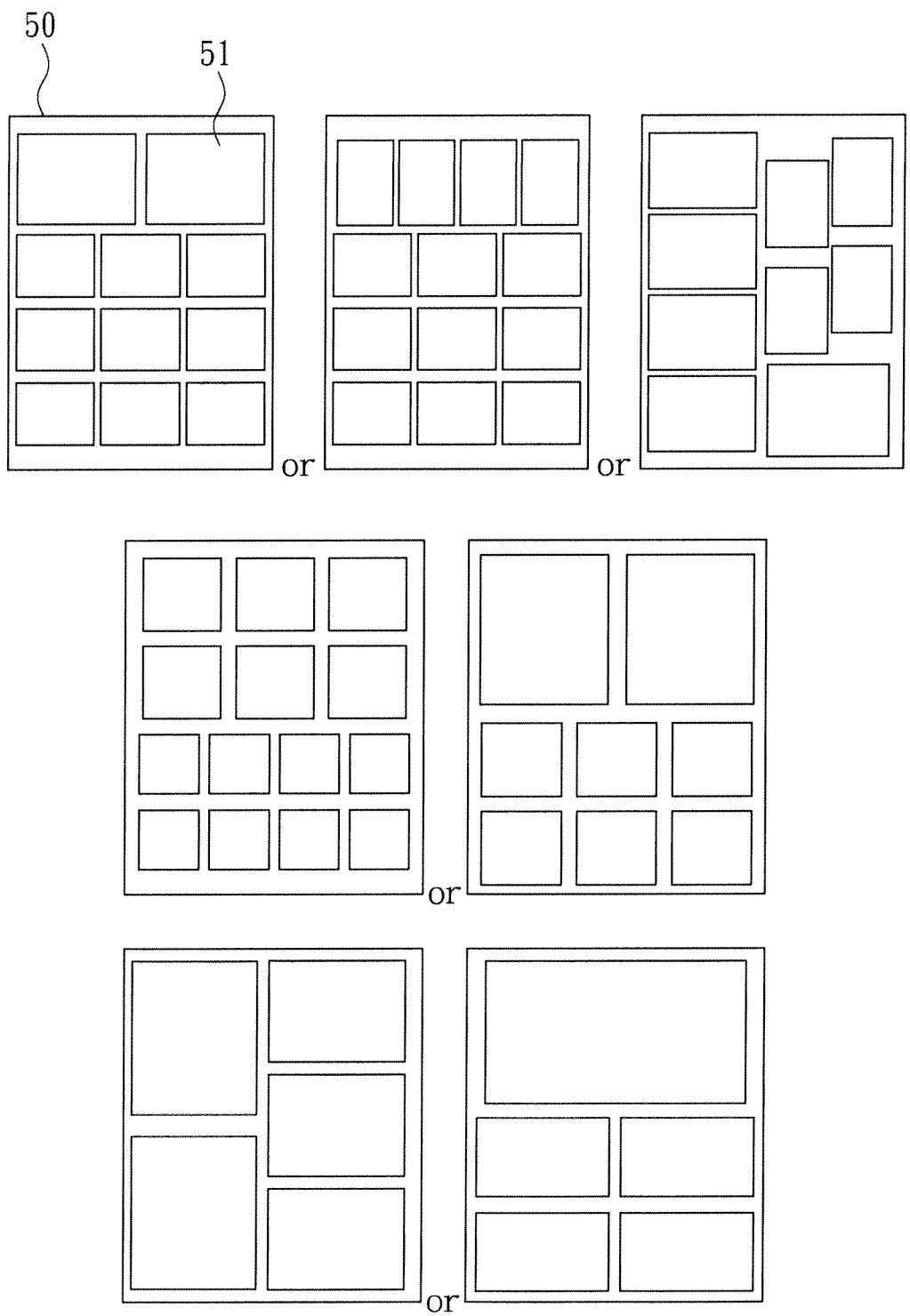
FIG. 5 is a schematic view of selecting a page format according to the invention.

In the step of selecting a page format or editing or editing a page format, the user selects a page format 50 to use via the human-machine interface 30 after the design software 15 is initiated (FIG. 5). The page format 50 can be a default template for photo albums on the market. The page format 50 has one or more empty frames 51 for the attachment of photos. The page format 50 can also be defined by the user, as shown in FIG. 2. The self-defined page format 50 initiates another page editing control element 55, which can control the position, shape, size, and angle of the empty frames 51.

In the step of selecting a digital photo in the page format, the user clicks any empty frame 51 in the page format 50 via the human-machine interface 30 to start a photo selecting screen. The user can selectively attach the selected digital photo to the empty frame 51. The selected digital photo automatically adjusts and records itself in order to fit the empty frame 51. The printed photo will also have exactly the same size. The selected photo is further tagged for the user's reference, deciding whether the same photo is used repeatedly in the same album.

In the step of editing the selected digital photo, as shown in FIG. 3, the user clicks a digital photo already attached to an empty frame 51 of the page format 50 via the human-machine interface 30 to start a photo editing control element 65. The photo editing control element 65 can magnify or shrink the size of the digital photo, add or remove text thereon, locally extract its parts, adjust its background or color it. It uses an extracting frame 61 to extract a particular part of the digital photo. The extracted part then fills the original empty frame 51 of the page format 50, becoming a used photo 70.

In the storing step, the user stores the previously edited photo album page format 50 after editing the digital photos in the page format 50. At the same time, the used photos 70 that have been edited or modified are stored as well. They are stored in a new storage address for a remote user to view the edited page format 50 or used photos 70 on a remote storage/display device via the Internet. This completes the preparation of a digital photo album.

After completing the steps of selecting a page format or editing a page format, selecting a digital photo in the page format, editing the selected digital photo, and storing, the user can further perform a photo printing step. The user photos 70 are downloaded from the folder that holds them to a portable storage device, and then sent to the digital photo studio for printing them according to predetermined specifications. With reference to the displaying unit 20 or printing out the edited page format 50, the user can then attach the printed photos to the corresponding positions in a physical album. This facilitates the preparation of a physical photo album.

Using the disclosed personalized photo album preparing system and the corresponding preparing steps, the user can edit digital photos according to the page formats of various kinds of self-attaching albums or sketch books on the market. The user may even decorate the photos with drawings, stickers, activity admission tickets, bus/train tickets, text descriptions, and so on, thereby rendering a personalized photo album. Through the easy editing functions of the design software, the user can implement his/her ideas on the page format and digital photos. Moreover, the required photos can be printed for the user to make a personalized photo album.

Furthermore, if one uses a 3D camera to capture a digital photo with 3D effects, the invention can also use a 3D display device to facilitate the editing of 3D digital photos on a photo album.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A personalized photo album preparing system for editing a page format and digital photos in a photo album, comprising:
   a processing unit for logic calculations and storing or outputting the page format and digital photos, the processing unit including a design module programmably configured for editing the page format and digital photos, and is first initiated by a user for uploading and storing digital photos in specific addresses in a storage device associated with the processing unit;
   a displaying unit connected with the processing unit for displaying an operating interface of the processing unit and of the design module;
   a human-machine interface connected with the processing unit and having the function of operating the processing unit and the design module, wherein in combination with a display on the displaying unit the user uses the human-machine interface to instruct the design module to define the page format to have a plurality of empty frames that identify locations for the attachment of digital photos thereat, the design module executing the page format based on one of a user selected template corresponding to available photo albums or a user defined page format, wherein responsive to the user defined page format being selected, the design module generates a display of a multiplicity of different sized empty frames from which the user can select in any combination and position using the human-machine interface to define the page format, subsequent to the page format being defined, the design module generates a photo selecting screen responsive to a user selecting any of the empty frames in the page format to selectively attach the digital photos in the empty frames, the selected digital photo being automatically adjusted and recorded by the design module to fit the size of the empty frame, responsive to user instructions the digital photos are selectively edited by the design module, and the edited page format and the edited digital photos are stored by the design module to new storage addresses; and
   an outputting unit connected with the processing unit and having the function of outputting the edited page format and digital photos.

2. The personalized photo album preparing system of claim 1, wherein the processing unit is a remote server, computer, or mobile phone; the displaying unit is a liquid crystal display (LCD), plasma display (PD), or touch-control display; the human-machine interface is a keyboard, mouse, or touch-control display; and the outputting unit is a printing device, storage device, or remote storage, displaying, printing device on the Internet.

3. The personalized photo album preparing system of claim 1, wherein after finishing the editing of the page format and digital photos the user further uses a remote storage and displaying device on the Internet to let other users view the edited page format or digital photos.

4. The personalized photo album preparing system of claim 1, wherein after finishing the editing of the page format and digital photos the user further downloads or stores the edited digital photos to a portable storage device, sends the digital photos to a digital photo studio to print according to predetermined specifications and, with reference to the displaying unit or by printing out the edited page format, attaches the printed digital photos to the corresponding positions in a physical photo album having the corresponding page format.

* * * * *